US012541604B2

(12) United States Patent
Li et al.

(10) Patent No.: US 12,541,604 B2
(45) Date of Patent: Feb. 3, 2026

(54) ENCRYPTION SYSTEM FOR VIRTUAL MEETING RECORDINGS

(71) Applicant: Lenovo (Singapore) Pte. Ltd., Singapore (SG)

(72) Inventors: Scott Li, Cary, NC (US); Igor Stolbikov, Apex, NC (US); Rafael Rodrigues Machado, Sorocaba (BR); Chunling Han, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 277 days.

(21) Appl. No.: 18/090,754

(22) Filed: Dec. 29, 2022

(65) Prior Publication Data

US 2024/0220638 A1 Jul. 4, 2024

(51) Int. Cl.
*G06F 21/60* (2013.01)
*H04L 12/18* (2006.01)

(52) U.S. Cl.
CPC ........ *G06F 21/602* (2013.01); *H04L 12/1818* (2013.01)

(58) Field of Classification Search
CPC ............................ H04L 12/1818; G06F 21/602
See application file for complete search history.

(56) References Cited

U.S. PATENT DOCUMENTS

| 10,972,299 | B2* | 4/2021 | Wiener | G06F 16/9535 |
|---|---|---|---|---|
| 11,627,006 | B1* | 4/2023 | Chew | H04L 51/02 |
| | | | | 704/275 |
| 11,974,074 | B2* | 4/2024 | Springer | H04L 12/1822 |
| 2022/0303148 | A1* | 9/2022 | Wang | H04L 12/1818 |
| 2022/0385494 | A1* | 12/2022 | Balaji | H04L 12/1822 |
| 2023/0169135 | A1* | 6/2023 | Panikkar | H04L 63/168 |
| | | | | 726/2 |
| 2023/0254291 | A1* | 8/2023 | Milne | H04L 9/50 |
| | | | | 713/168 |
| 2023/0412411 | A1* | 12/2023 | VanBlon | H04N 7/152 |

* cited by examiner

*Primary Examiner* — Thomas J Dailey
(74) *Attorney, Agent, or Firm* — FERENCE & ASSOCIATES LLC (57) ABSTRACT

One embodiment provides a method, the method including: identifying, at an information handling device and utilizing a security encryption system, a virtual meeting invitation; recording, utilizing the security encryption system, the virtual meeting responsive to at least one participant accessing the virtual meeting via the virtual meeting invitation; encrypting, utilizing the security encryption system, the recording of the virtual meeting; and storing, after the encrypting, the encrypted recording of the virtual meeting in a storage system. Other aspects are claimed and described.

18 Claims, 6 Drawing Sheets

ENCRYPTION SYSTEM FOR VIRTUAL MEETING RECORDINGS

BACKGROUND

Virtual meetings have evolved into a common business practice because of the ability to host and/or join a meeting with a plurality of participants from remote locations. Historically, when such a meeting of the minds occurred, it was required to have each meeting participant present in the same room. This is no longer necessary. However, with an increase in convenience and usability as is provided by the use of a virtual meeting, a decrease in security is present. Since each participant is not present in the same location when a virtual meeting is occurring, the potential of compromising sensitive data increases with the increase of variables needed to communicate (e.g., the need to communicate over a network opens a communication line to potential hackers).

BRIEF SUMMARY

In summary, one aspect provides a method, the method including: identifying, at an information handling device and utilizing a security encryption system, a virtual meeting invitation; recording, utilizing the security encryption system, the virtual meeting responsive to at least one participant accessing the virtual meeting via the virtual meeting invitation; encrypting, utilizing the security encryption system, the recording of the virtual meeting; and storing, after the encrypting, the encrypted recording of the virtual meeting in a storage system.

Another aspect provides an information handling device, the information handling device including: a processor; a memory device that stores instructions that when executed by the processor, causes the information handling device to: identify, utilizing a security encryption system, a virtual meeting invitation; record, utilizing the security encryption system, the virtual meeting responsive to at least one participant accessing the virtual meeting via the virtual meeting invitation; encrypt, utilizing the security encryption system, the recording of the virtual meeting; and store, after the encrypting, the encrypted recording of the virtual meeting in a storage system.

A further aspect provides a product, the product including: a computer-readable storage device that stores executable code that, when executed by the processor, causes the product to: identify, at an information handling device and utilizing a security encryption system, a virtual meeting invitation; record, utilizing the security encryption system, the virtual meeting responsive to at least one participant accessing the virtual meeting via the virtual meeting invitation; encrypt, utilizing the security encryption system, the recording of the virtual meeting; and store, after the encrypting, the encrypted recording of the virtual meeting in a storage system.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As virtual meetings become a more prominent business practice, traditional approaches for maintaining access to presented information have evolved with technology but still remain dated in a sense. Similar to using a voice recorder when a traditional in-person meeting is being held between two or more people, a virtual meeting communication medium that is hosting a virtual meeting and/or the device in which the user is utilizing to access the virtual meeting communication meeting may record the meeting as it is ongoing.

This recording of the virtual meeting is traditional in a sense that a method of recording is being used in order to capture and thereafter, save the information being discussed. This traditional method of recording has evolved with technology by, for example, recording both audio and video of the virtual meeting, and further by storing the virtual meeting recording in a remote storage location, thereby allowing multiple people to access the recording at a later time. The traditional manner of recording a meeting, on the other hand, meant that the storage location of the recording remained present on the user's person, thereby only being accessible to the single person unless that person shared the recording. For example, if using a voice recorder during the in-person meeting, the recording is stored on the device and/or the memory component present for the device (e.g., tape, disc, internal memory, etc.).

The use of traditional methods for recording a meeting result in each person attending and recording the meeting to have different recordings of the meeting. In order to share the information captured in the recording, a user would either have to listen and transcribe each word that is said by hand or a copy of the recording could be made using traditional copying techniques (e.g., outputting a copy on tape, utilizing transcription services, etc.). As the technology surrounding recordings advanced to present level, the potential for compromising sensitive data present within a meeting has increased. In conventional methods, virtual meeting recordings are done upon a user request. In other words, the recording of the virtual meeting occurs under the discretion of the user by the user inputting a command into a system to ensure that the information being discussed during a specific time is recorded.

Today, virtual meeting communication mediums are commonly associated with a specific storage location that coincides with accessing the virtual meeting. Therefore, after recording the virtual meeting, the storage location of the recorded virtual meeting may be known. Reliance on the communication medium and the associated storage system to record and store the meeting recording opens a potential avenue for compromising information if the storage location has weak security.

Additionally, in conventional methods for hosting/attending and storing the virtual meeting recording, access to the virtual meetings as it is ongoing may lead to another version of compromising the information being discussed in the virtual meeting. Meetings may be hijacked by imposters and/or bad actors when a login to the virtual meeting has been obtained by an unintentional source (e.g., competitor, pranksters, etc.). Access to a virtual meeting by an imposter may not be recognized until it is too late and/or not recognized at all. At this point, the information has been compromised. Thus, hackers and/or imposters may gain access to virtual meeting recordings by accessing a storage device over a network that has the recordings stored publicly and/or with little to no security, and by impersonating a participant present in a virtual meeting while it is ongoing. What is needed is a more secure method for data protection while using and subsequent to using a virtual meeting communication medium to record and store a virtual meeting.

Accordingly, the described system and method provides a technique for encrypting a virtual meeting recording and securely storing the virtual meeting in a storage system by use of a security encryption system. The system may then permit access to the encrypted meeting recording subsequent to receiving permission from enough of the original participants of the virtual meeting at the security encryption system. A virtual meeting invitation may be received by a potential participant of a virtual meeting, and upon accessing the virtual meeting through the virtual meeting invitation, a recording of the virtual meeting may begin. At the conclusion of the meeting, the security encryption system may take the recorded meeting and encrypt and then store the recording in an appropriate storage system. The encrypting of the meeting recording converts identification information into a secure combination of characters and then stores the encrypted meeting recording to ensure a secure storage environment and minimize potential for compromising the information.

As the security encryption system is encrypting the virtual meeting recording, the security encryption system may also generate an encryption key associated with the meeting. The encryption key is meeting specific and consists of multiple unique key shards that are each participant specific. These unique key shards may identify the virtual meeting discussed and each participant present in the virtual, and may act as a portion of a necessary encryption key needed to access the virtual meeting at a later time. In other words, the encryption key generated for a meeting may be portioned out to each participant present in the virtual meeting via the key shards. Then, when the recording of the virtual meeting is attempting to be accessed after the completion of the meeting by a user (e.g., a participant of the meeting, a third party, etc.), each participant of the virtual meeting that has a unique key shard may receive a notification to input their user specific key shard to grant access to the virtual meeting recording at the storage system.

In the system, a threshold level of unique key shards may be established based upon a determined security/sensitivity level of the information present within the virtual meeting recording. Additionally, in the system, a participant's willingness and/or responsibility to vet any request to access information encrypted and stored in the storage device acts as an additional layer of security for the system in hopes of negating the compromising of sensitive data. Being that the unique key shard is meeting and participant specific, when a key shard is inputted into the security encryption system providing permission to access the recording, the identity of the participant associated with the key shard is recorded. This identification of the participant may assist a system with identifying potential threats to compromising data. Such a system provides a user with a method for securely recording and encrypting a virtual meeting in order to decrease compromising information discussed in the virtual meeting. The system then permits access to the stored virtual meeting recording at the discretion of each participant of the virtual meeting or each participant who has a key shard.

The illustrated example embodiments will be best understood by reference to the figures. The following description is intended only by way of example, and simply illustrates certain example embodiments.

Figure 1:
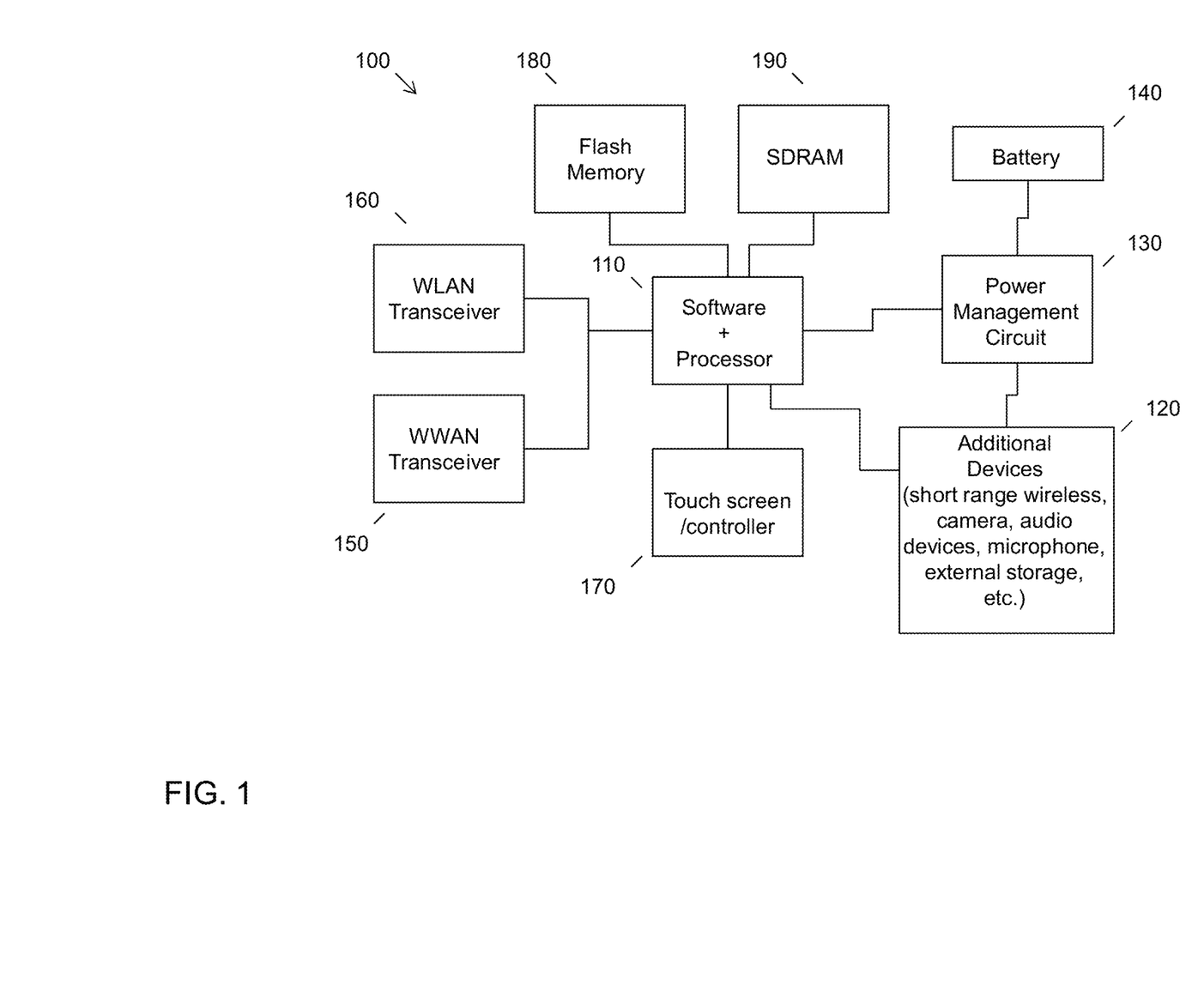
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
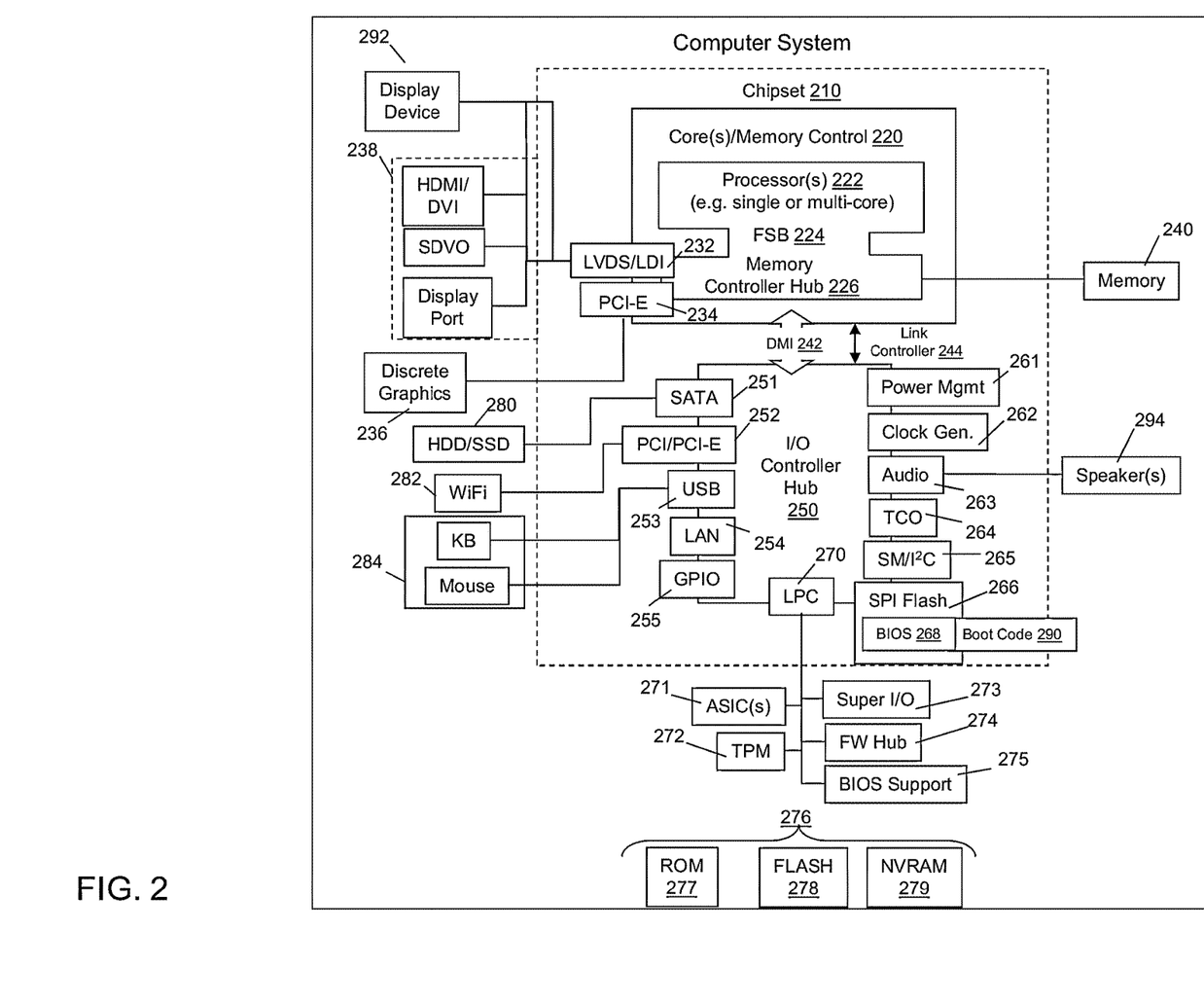
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in a system that facilitates virtual meetings, records virtual meetings, encrypts the recordings, stores the recordings, and/or allows access to stored recordings. For example, the circuitry outlined in FIG. 1 may be implemented in a tablet or smart phone embodiment, whereas the circuitry outlined in FIG. 2 may be implemented in a personal computer embodiment.

Figure 3:
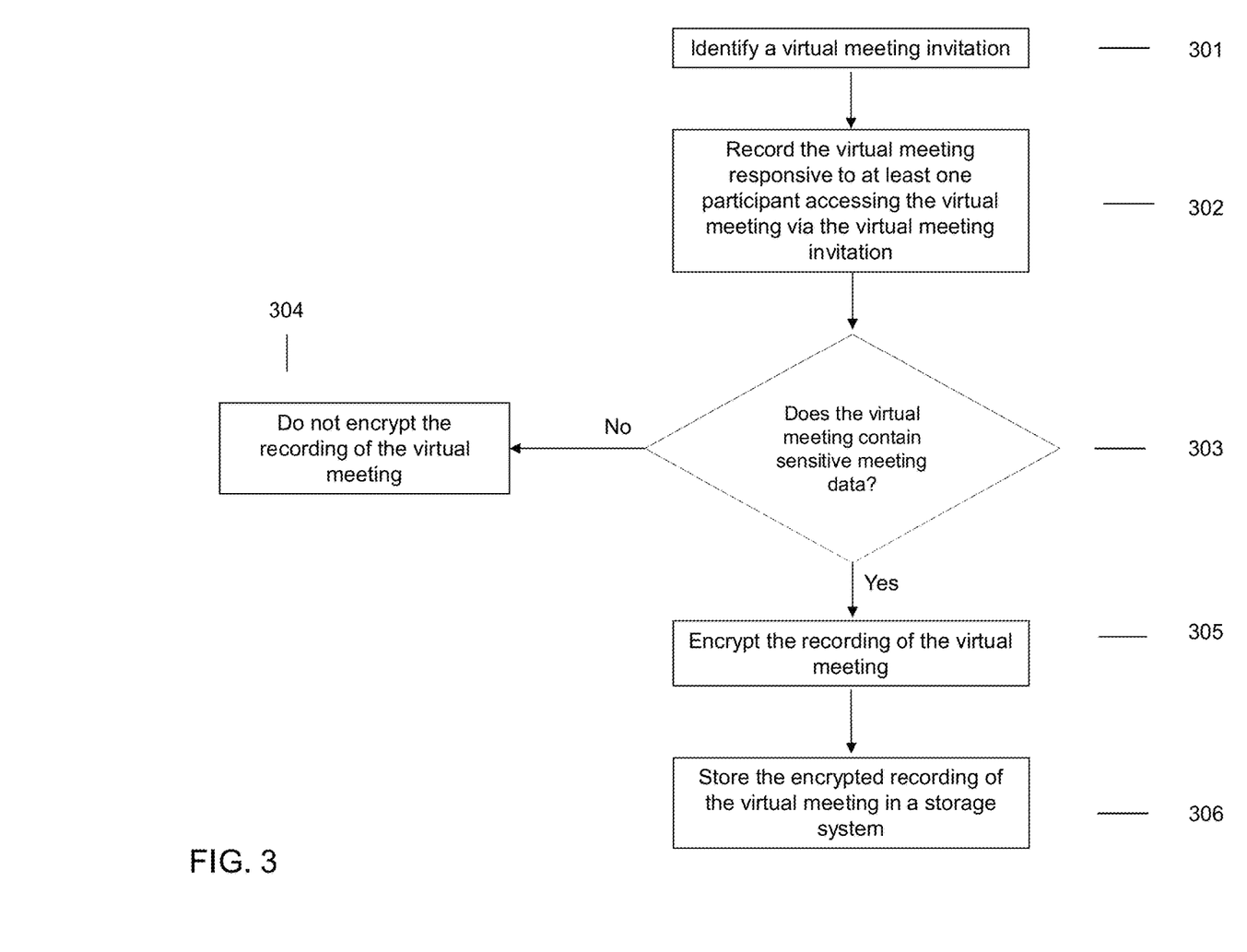
FIG. 3 illustrates an example method for storing an encrypted recording of a virtual meeting by use of a security encryption system.

FIG. 3 illustrates an example method for storing an encrypted recording of a virtual meeting by use of a security encryption system. The method may be implemented on a system which includes a processor, memory device, output devices (e.g., display device, etc.), input devices (e.g., keyboard, touch screen, mouse, microphones, image capturing sensors, etc.), and/or other components, for example, those discussed in connection with FIG. 1 and/or FIG. 2. While the system may include known hardware and software components and/or hardware and software components developed in the future, the security encryption system is specifically programmed to perform functions as described herein to store, at the storage device associated with a virtual meeting communication medium used to host a virtual meeting, an encrypted version of the virtual meeting recording that may be accessed in the future by use of an encryption key.

The security encryption system may run in the background of an information handling device and may be activated when the device is activated. Additionally, or alternatively, the system may be activated when an application associated with a virtual meeting (e.g., video conferencing platform, virtual classroom platform, virtual meeting communication medium, etc.) is activated, detected, or otherwise opened. The system may also be activated upon detection of a virtual meeting invitation to join a virtual meeting at a user information handling device. In this case, the security encryption system may not be activated until a virtual meeting is joined at the time of the invitation from an information handling device associated with the user.

Once the security encryption system is activated on a device, the system may be utilized throughout the process of recording the virtual meeting being held over the virtual meeting communication medium, encrypting the virtual meeting upon completion of the virtual meeting, and storing the encrypted virtual meeting in a storage system. Continued use of the security encryption system may further include permitting access to the encrypted virtual meeting recording upon receiving a predetermined threshold amount of unique key shards of a generated encryption key for the encrypted meeting recording from the participants of the meeting. The security encryption system may then decrypt the virtual meeting recording to which access has been requested subsequent to determining that the threshold amount of unique key shards was inputted into the system, and share the virtual meeting recording with whomever is accessing the storage system. Continued use of the security encryption system will train the device regarding when to record, encrypt, and store the virtual meeting recording, and when to decrypt and share the virtual meeting recording.

To perform the steps present in the security encryption system and in order to accurately encrypt and generate and encryption key for e virtual meeting, and decrypt and share the virtual meeting recording, the security encryption system may utilize a neural network, machine-learning model, and/or other learning algorithm, collectively referred to as a machine-learning model for ease of readability. The machine-learning model can be trained utilizing previously encrypted meeting recordings. In other words, the machine-learning model is given access to previously established encrypted and stored virtual meeting recordings. These established encrypted virtual meeting recordings and generated encryption keys are referred to as a training dataset, which may be one or more training datasets.

Using the training dataset(s), which may change over time, the machine-learning model learns nuances between the encryption types and generated encryption keys for each type of virtual meeting recording. This results in more accurately identifying virtual meeting recording boundaries and the topics discussed with the virtual meeting. For example, the machine-learning model can learn when a recording is completed and should be encrypted and thereafter stored in a storage device, and even more specifically, determine when enough unique key shards have been provided back to the system after receiving a notification from the storage device for potentially granting permission to view the virtual meeting recording after decrypting. As virtual meeting recordings are received and encrypted, and the encryption key is generated, the machine-learning model can learn additional nuances and become more refined over time. Thus, while there is an initial training dataset that is used to initially train the machine-learning model, the machine-learning model is learning over time based upon new information received by the machine-learning model, thereby evolving to become more accurate. This is generally referred to as reinforcement training. Other techniques for training the machine-learning model(s) are contemplated and possible, including, unsupervised learning, a combination of learning techniques, and/or the like.

At 301, the system identifies a virtual meeting invitation. In the system, a user may receive, at their information handling device, a virtual meeting invitation. This virtual meeting invitation may include traditional meeting characteristics, for example, time the meeting will take place, one or more topics that will be discussed in the virtual meeting, virtual medium communication medium details, and the like. The virtual meeting invitation also identifies a list of participants of the virtual meeting. As a host of the virtual meeting is preparing to send out the virtual meeting invitation to the appropriate participants, the selecting of each meeting participant establishes who is invited to participate in the virtual meeting. In the system, when the topic of the virtual meeting is generic or not a high-priority, the list of participants (or those that receive the meeting invitation) may be a large list. For example, a companywide email for a fortune 500 company may include a plurality of participants. As the topic of the virtual meeting becomes more specific for discussing classified/sensitive information, a number of potential participants may decrease to only those participants that are authorized to encounter such topics.

As the list of meeting participants is established by the host utilizing the security encryption system, the system may also receive encryption settings surrounding the one or more topics that may be discussed in the virtual meeting. Encryption settings may be determined based upon a level of security needed to assure that the information discussed within the meeting does not become compromised. Encryption settings include, but are not limited to, a topic sensitivity level, a number of required participants present in the meeting before sharing information related to a topic, a threshold number of participants needed to access the virtual meeting recording in the future, and/or the like.

A topic sensitivity level may determine a level of security needed in order to secure the contents of the meeting. This topic sensitivity level may range from low- or no-sensitivity to high-sensitivity with variable levels present between the two ends. For example, topics discussing general business practices that are common amongst all businesses may be deemed to have a low-sensitivity level. The company-wide email including specific business goals and practice breakdowns may be considered to have a higher sensitivity level than the general business practices, but may not be seen as having a high-sensitivity level. In the system, for example, a high-sensitivity level may be labeled onto a topic discussing trade secrets and/or company sales data.

The encryption settings present in the virtual meeting invitation provided to select participants also includes tracking a threshold number of participants present in the meeting before sharing information related to a topic and a threshold number of participants needed to access the virtual meeting recording in the future. In the system, these two threshold levels of participants are commonly the same number. However, this is non-limiting, and a host may determine that a difference between the threshold values is appropriate. In the system, the threshold number of participants present in the meeting before sharing information related to a topic establishes a baseline of participants present in the virtual meeting prior to discussing a topic. Reaching such a threshold prior to discussing will further influence an amount of unique key shards to be produced by the security encryption system as an encryption key is being generated. In the system, the threshold number of participants needed to access the virtual meeting recording in the future also relies on this production of unique key shards.

Description of the encryption key and unique key shards will be described in further detail herein. However, it is important to understand that the traditional meeting settings, the list of participants, and the encryption settings for the virtual meeting are established by the host at the time of identifying a virtual meeting invitation, at 301, in the system. It should also be noted that, like traditional meeting invitations, these meetings invitations may be forwarded where the host is notified of the forwarding of the meeting. In this case, depending on a response by the host, the system may take additional action regarding the recording encryption, for example, adding an key shard, relabeling the sensitivity of some topics, denying access to the recording by the new participant, and/or the like.

At 302, the system may record the virtual meeting responsive to at least one participant accessing the virtual meeting via the virtual meeting invitation. The security encryption system may utilize the encryption settings, as disclosed in

301, to determine if an acceptable number of participants are accessing the virtual meeting via the virtual meeting invitation, at 302. The threshold level of participants needed is identified in the encryption settings of the virtual meeting, and recording of the virtual meeting will only occur when the threshold level of participants is reached and maintained. For example, in virtual meeting that has the lowest sensitivity level, the threshold level of participants needed in order to record may be a single participant. However, in the system, for example, when the topic of the virtual meeting is considered to have a high-sensitivity level, the security encryption system may record the virtual meeting only when a plurality of participants are present, for example, when six participants are present in the virtual meeting. The host of the meeting may identify the threshold number of participants required when creating the virtual meeting invitation or at a later time before the virtual meeting has started. If the settings have not been set before meeting starts, the host may be prompted to enter the settings upon accessing the virtual meeting.

In the system, when the virtual meeting invitation establishes a threshold level of participants needed to record the virtual meeting, at 301, and this threshold level is reached, the system, at 302, may continuously record the virtual meeting as long as the threshold level of participants remains. In the system, when a threshold level of participants falls below a necessary threshold of participants, the security encryption system may pause the recording. For example, in the system that requires six participants to be present in order for the recording of the virtual meeting, and at least six of the participants are present in the meeting, there is not issue with recording, at 302. However, if the threshold number of participants falls to five participants or less (e.g., emergency signoff, conflicting meetings, etc.), the recording of the virtual meeting may pause. In the system, pausing the meeting may occur when the number of participants falls below the threshold value, and as long as the virtual meeting is still ongoing, a possibility to revive and/or continue the recording may be present.

In the system, after the threshold falls below a needed number of participants and the virtual meeting of the virtual meeting communication medium is maintained, upon the detection of a new and/or additional participant sign-in may reestablish the recording after reaching the threshold level, again. In the system, an amount of time to reestablish the recording may be present (e.g., 10 minutes after dropping below threshold). In the system, when the number of participants falls below the predetermined threshold while the system is recording, at 302, the security encryption system may terminate the virtual meeting. In the system, if five participants were invited to attend the virtual meeting, and all five participants are needed in order to record the virtual meeting, and during the virtual meeting at least one participant must leave, the security encryption system may recognize that there are not any additional participants that may sign-in to reestablish the meeting. Thus, the recording of the virtual meeting is paused, and the virtual meeting is terminated. In the system, partial recordings may be saved in a storage device.

In the system, upon recognizing that a threshold level of participants is met, at 302, the security encryption system may automatically begin recording the virtual meeting. The system's ability to react automatically based upon the threshold value may also include the ability to pause and/or terminate a virtual meeting recording, at 302, in response to the number of participants falling below a threshold level. Additionally, or alternatively, the system may require user input for initiating, at 302, the recording of the virtual meeting responsive to at least one participant accessing the virtual meeting through the virtual meeting invitation, and, as well, may need manual user input to pause and/or terminate a virtual meeting.

In the system, after identifying the virtual meeting invitation, at 301, and attempting to access the virtual meeting through the invitation, at 302, the system may identify how a participant is accessing the virtual meeting. In the system, the participant may access the virtual meeting through a link present in the virtual meeting invitation. Utilizing such a method may require little-to-no additional input from the user since the identity of the user is already established with the invitation. In another system, the participant may input meeting identification data into a virtual meeting communication medium application. In this situation, the participant may be requested to provide additional identification information about themself in order for the security encryption system to ascertain that a participant is permitted to attend the virtual meeting. This provides extra assurance that a bad actor will be unable to access the meeting.

At 303, the security encryption system, may determine whether the virtual meeting contain sensitive meeting data. As mentioned previously, at 301, the virtual meeting invitation may previously establish a security/sensitivity level of the information to be discussed during a virtual meeting. However, at 303, the system is utilizing the information present in the meeting invitation of 301 to determine a level of encryption associated with the sensitive meeting data. In the system, when it is determined that the information being discussed in the virtual meeting does not include sensitive meeting data, at 303, the security encryption system will elect to not encrypt the recording of the virtual meeting, at 304. In the system, at 304, the system may not encrypt the meeting with the same level of security as other determined topics that may be been discussed. However, a general encryption key may still be generated for such a meeting. This encryption key may assist with accessing the virtual meeting with no sensitive meeting data in the future.

In the system, when it is determined that the virtual meeting does contain sensitive meeting data, at 303, the security encryption system may move forward with encrypting the recording of the virtual meeting, at 305. Encrypting, as understood in light of the system and methods discussed herein, is a method of converting and concealing sensitive data (e.g., a virtual meeting recording) in order to remain secure and accessible by only those permitted to view the information. When encrypting the recording, at 305, the security encryption system may generate an encryption key associated with the virtual meeting. In the system, and as mentioned previously, a security level surrounding the at least one topic being discussed over a virtual medium is established, and when encrypting at 305, this established security level will influence a level of security for the generated encryption key. For example, the encryption key for a virtual meeting recording with low-sensitivity may be a more common encryption key or utilize a less secure encryption algorithm, whereas the encryption key generated for or the encrypting scheme or algorithm utilized for encrypting a virtual meeting recording with a high-sensitivity level may be much more complex and/or secure. This variable difference between encryption key types and/or encryption algorithms is a direct affiliation with the determined security and sensitivity level of the topics discussed in the virtual meeting, and previously established by the host of the virtual meeting, at 301.

When generating the encryption key while encrypting the recording of the virtual meeting, at 305, the security encryption system may generate unique key shards for each participant of the virtual meeting. A unique key shard is a portion of the generated encryption key associated with the virtual meeting recording being encrypted, at 305. The encrypting the recording of the virtual meeting is meeting specific, meaning that when attempting to access the virtual meeting in the future, the encryption key for the recording will only reference one specific recording. In the system, the unique key shard provided to each participant of the virtual meeting, as described by the established list of participants in 301, is only affiliated with that participant. In other words, each participant of the virtual meeting that is being encrypted receives a unique key shard that is meeting specific and participant specific. This means, there is not doubles of key shards produced, and that all the key shards are original and coincide with the generated encryption key.

In the system, the unique key shard received by the participant in response to the encrypting the recoding of the virtual meeting may act as a participant identifier. Since each unique key shard is participant specific, identification information of the participant may be attached to the unique key shard received. Such identification information may be utilized in the future when a recording is attempted to be accessed at a storage system containing the encrypted virtual meeting recording.

Before a participant and/or a third-party may attempt to access the encrypted virtual meeting recording, the system may store the encrypted recording of the virtual meeting in an appropriate storage system, at 306. In the system, the storage system may include a database and/or any type of remote storage device (e.g., hard disk drive, solid-state drive, solid-state hybrid drive, etc.). In the system, the storage system may assign a meeting identifier associated with the security level of the virtual meeting. In other words, the previously established security level affiliated with at least one topic, as determined by the host of the virtual meeting at 301, will influence a meeting identifier of the encrypted and now stored virtual meeting recording. In the system, the meeting identifier coincides with the unique key shards generated and provided to each participant of the meeting, at 305. Since the unique key shards are participant specific and meeting specific, the meeting identifier assigned by the storage system for the encrypted meeting provides a location of the encrypted virtual meeting within the storage system. This storing of the encrypted recording of the virtual meeting in a storage system, at 306, provides the system with a secure environment to house sensitive topic data and minimize compromising such data.

Figure 4:
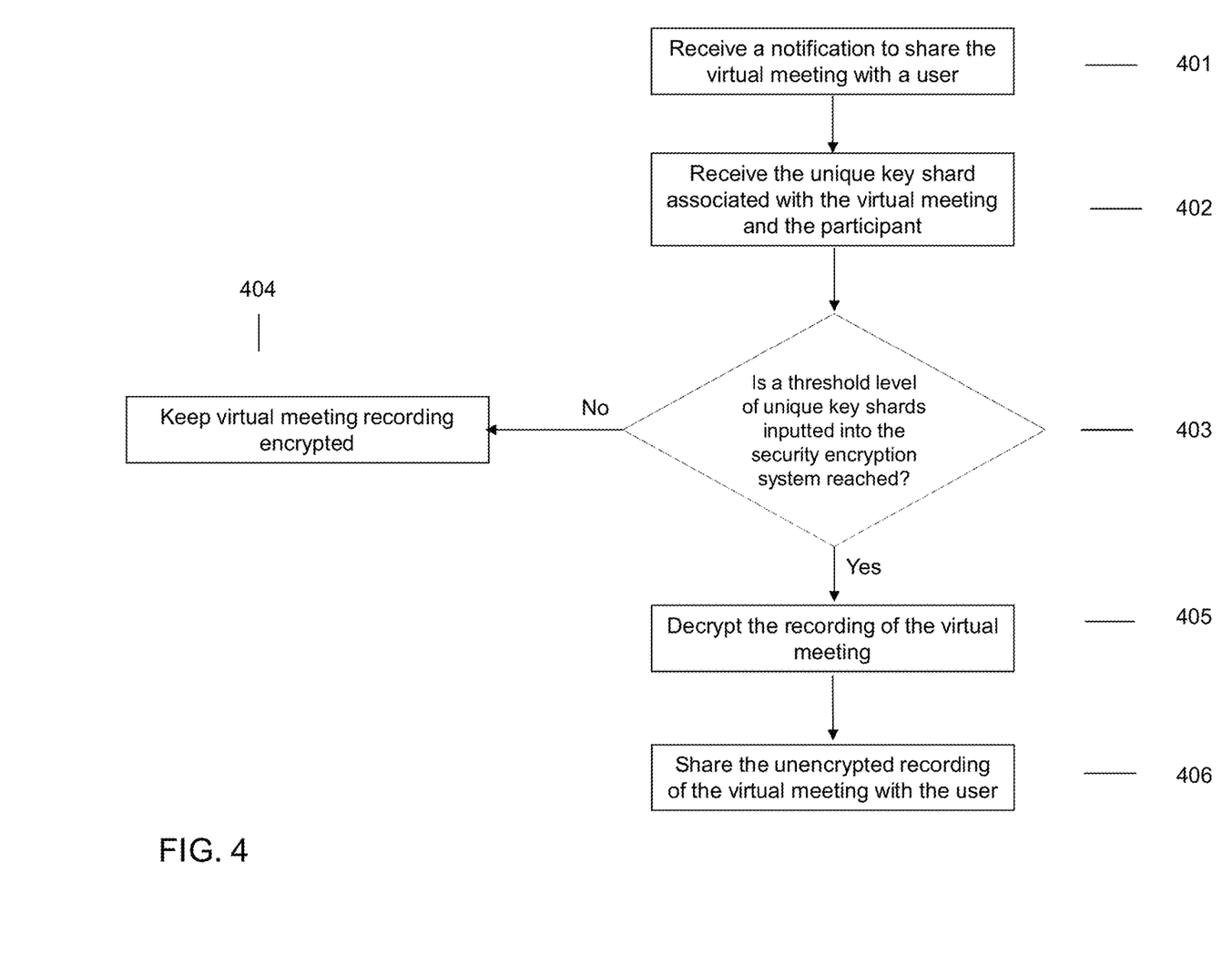
FIG. 4 illustrates an example method for sharing a stored recording of the virtual meeting with a user by use of a security encryption system.

Referring now to FIG. 4, an illustration for an example method for sharing an unencrypted recording of the virtual meeting with a user by use of a security encryption system is provided. After a virtual meeting is recorded, encrypted, and stored based upon a determined security and/or sensitivity level of the topics discussed during the virtual meeting, as is described throughout FIG. 3, a user (e.g., a third-party, a meeting participant, etc.) may attempt to access the virtual meeting recording present in the storage system. Such accessing may be used to identify information that was discussed, become familiar with the information present within the virtual meeting recording, and the like. However, in the system, accessing such virtual meeting recordings may include undergoing a process of granting permission to access an encrypted virtual meeting.

At 401, the security encryption system of the information handling device of a participant may receive a notification to share the virtual meeting with a user, who may be one of the original meeting participants. In the system, the receiving may include receiving a request from the storage system indicating that a user is requesting access to a virtual meeting recording. As mentioned above, the user may be a participant of the virtual meeting or may be a third-party (e.g., a user that was not present in the virtual meeting). In the system, when receiving the notification to share or access the recording, the security encryption system may provide a query to input a unique key shard associated with the virtual meeting attempting to be accessed. As mentioned previously, a predetermined number of unique key shards may need to be inputted into the security encryption system prior to sharing sensitive information with a user. Thus, receiving a query from storage device requesting the input of a key shard may be the system attempting to reach the necessary unique key shard threshold value.

Additionally, or alternatively, upon receiving a notification to share the virtual meeting with a user, at 401, and prior to inputting a unique key shard associated with a participant, the participant has a responsibility to determine that the request for to share the virtual meeting is provided by a legitimate user. Rather than inputting a unique key shard without any knowledge of the user attempting to access the virtual meeting recording, each participant with a unique key shard may interpret the request and determine whether or not they would like to provide their key shard to permit access to sensitive information. This level of filtering performed by each participant adds another level to the security of the system, for if the participant feels that providing the unique key shard will lead to the compromising of sensitive data, then the participant should not and will not provide their unique key shard to the notification, thereby denying access to the virtual meeting recording. As mentioned previously, the unique key shard provided to each participant is user specific. Thus, if a virtual meeting recording does become compromised, the system may easily determine which participant provided the key shard to the illegitimate source, and may further influence a participant's ability to receive future unique key shards associated with a virtual meeting.

Upon determining that the notification received from the storage system to share the virtual meeting, at 401 is legitimate, the system may receive the unique key shard associated with the virtual meeting and participant, at 402. This providing of the unique key shard to the notification, at 402, is determined to be authorized by the participant(s) that enters their unique key shard to share the virtual meeting recording with the requesting user.

After receiving one or more unique key shards, at 402, the system may then determine how many unique key shards were received in comparison to the required amount of unique key shards needed to view the sensitive information present within the requested virtual meeting recording, at 403. At 403, when determining if a threshold level of unique key shards inputted into the security encryption system is reached, the security input system may first recognize the predetermined amount of required unique key shards that must be collected to reach the threshold value (as is established by the host at 301), and thereafter account for the amount of unique key shards received, at 402, in response to the notification, at 401. When it is determined, at 403, that the amount of unique key shards received falls below the required threshold value, the system may keep the virtual meeting recording encrypted, at 404, and stored in the storage system. Access is not permitted for a user to view the virtual meeting recording. The system may also make a second notification requesting the key shards.

Moreover, when it is determined, at 403, that the threshold level of required unique key shards is inputted into the security encryption system in response to the notification, the system may move forward to decrypt the recording of the virtual meeting, at 405. To decrypt, or decrypting, describes the system's ability to transform a previously encrypted virtual meeting recording (or additional form of encrypted data) back into an original state. This transforming on encrypted data to decrypted data will allow a user to view information that previously was not available to them.

In the system, decrypting the recording of the virtual meeting, at 405, may also include taking into account additional constraints surrounding accessing the decrypted virtual meeting recording. In the system, the additional constraints, or secret sharing schema, may include one or more characteristics that a user attempting to view the virtual meeting recording must be aligned with while viewing the information. For example, secret sharing schema may include location data of the user, accessing of the sensitive data on an approved device, a time period for viewing the sensitive data, and/or the like.

In reference to the location data, in the system, the security encryption system may utilize one or more sensors operatively coupled to the device of the user to determine where the user, who is attempting to access an encrypted virtual meeting recording, is located. If it is determined that the user is located in an area that may compromise the information present within the virtual meeting recording date, the security encryption system may not provide the sensitive data to the user. The user may also be notified of the reason the data is blocked from access. Based upon the predetermined security level of the virtual meeting recording, a location for viewing the sensitive data may be identified.

For example, a user that is requesting to view a virtual meeting recording and is determined to be in an office and alone may receive the virtual meeting recording. However, in the system, if a user that is requesting to view a virtual meeting recording is determined to be in a public space (e.g., a coffee shop, grocery store, public park, etc.) that includes common human traffic, the security encryption data may not send the virtual meeting recording to the user because of a likelihood of the information becoming compromised. In the system, the security encryption system may fail to transmit that the virtual meeting recording to a user even when a threshold level of the unique key shards have been inputted, at 402, based upon the additional constraints.

As for the device in use, the system may determine what type of device that a user is utilizing while attempting to access a virtual meeting recording that includes sensitive information. In the system, if a user is requesting access to view a virtual meeting on an outdated and/or unapproved device, the security encryption system may fail to decrypt the virtual recording and will not share the virtual recoding with the user. Similar to the location data, even if a threshold level of unique key shards are inputted, the security encryption system may refuse to decrypt the virtual meeting, at 405, if a possibility of the information becoming compromised is present. As can be assumed, older devices and unapproved devices may be more subject to hacking that those devices that are approved. When the user fulfills the additional constraints, the recording may then be available to the user.

In the system, when decrypting the recording of the virtual meeting, at 405, the security encryption system may determine that a time period or window may be supplied to the user to permit viewing of sensitive information for only that amount of time. Setting boundaries around when virtual meeting recording data may be viewed will incentivize the user to absorb as much of the information as they can within the designated time period. Additionally, by only allowing permission to view the content for a period of time, security of the information can be maximized. In the system, a time period may be presented in combination with a location of the user. Providing a time period to view sensitive information while the user is determined to be in a potentially compromising situation may ascertain that a minimal amount of risk may be taken while decrypting the virtual meeting recording being viewed by the user. Additionally, or alternatively, in the system, the time period for viewing the decrypted sensitive data of the virtual meeting recording may be based upon a device being utilized by the user requesting access to the virtual meeting recording.

After weighing the secret sensitive schema surrounding a user and based upon the predetermined security level of the virtual meeting recording, the system may share the unencrypted recording of the virtual meeting with the user, at 406. This sharing of unencrypted data to the user grants permission of the user to view the sensitive data present within the virtual meeting recording. Subsequent to the user viewing the decrypted virtual meeting recording, the system may shred the decrypted information, while the encrypted version remains in the storage system, to ascertain that the sensitive information present within the virtual meeting recording is not shared without outsiders/competitors and will not become compromised. Continued access to sensitive data requiring a threshold level of unique key shards in order to originally access the virtual meeting recording is not permitted.

Figure 5:
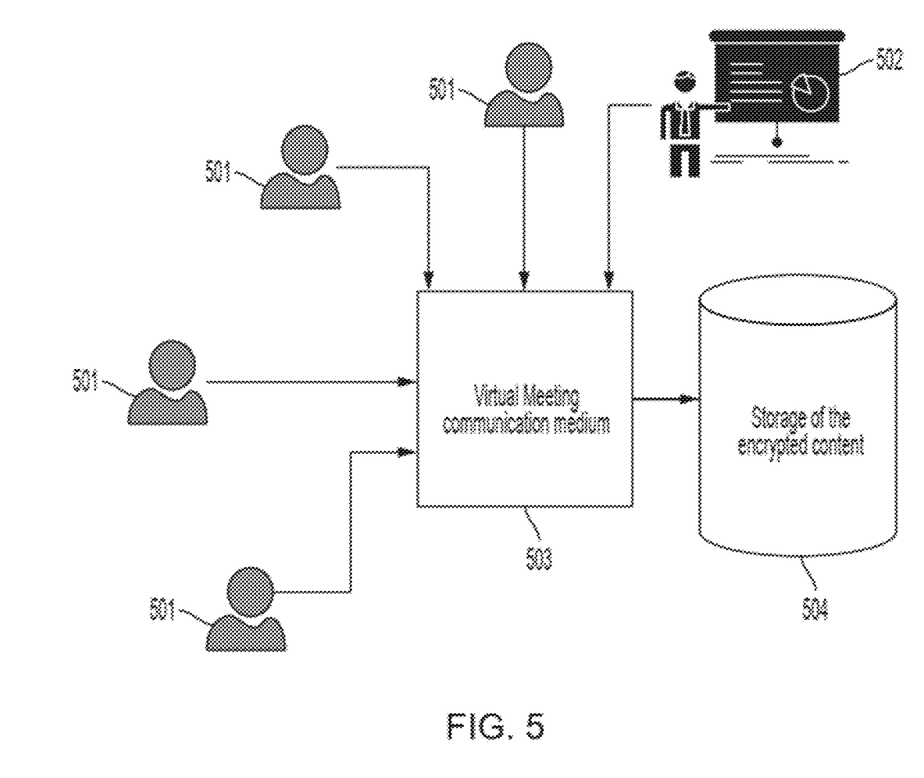
FIG. 5 illustrates an example virtual meeting setup over a virtual meeting communication medium with a storage system.

FIG. 5 is directed towards an example virtual meeting setup over a virtual meeting communication medium with a storage system. As can be seen in the illustration, each participant is labelled 501, as these are all remote participants accessing the virtual meeting held over a virtual communication medium at 503. The host 502 of the virtual meeting is responsible for producing and providing the virtual meeting invitation that includes both traditional meeting settings, encryption settings, as well as determines the list of participants that that may attend the virtual meeting. It is during setups such as this that the recording of the virtual meeting by the security encryption system is present. Once the virtual meeting has come to a close, the recording of the virtual meeting is then transmitted to the storage device 504 that is in communication with the virtual meeting held over the virtual meeting communication medium 503. As mentioned previously, the virtual meeting recording may be encrypted subsequent to the completion of the meeting and prior to storage in the storage system 504.

Figure 6:
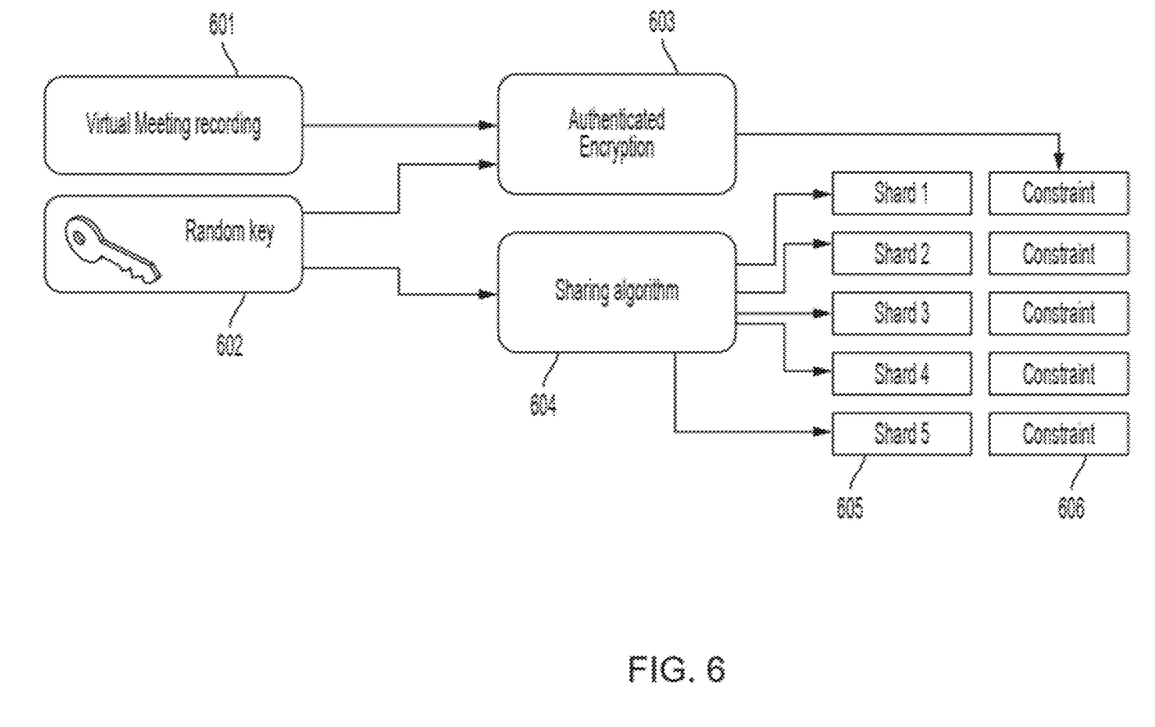
FIG. 6 illustrates an example method for generating an encryption key for the virtual meeting recording.

FIG. 6 is directed towards an example method for generating an encryption key for the virtual meeting recording and each unique key shard for a participant of the virtual meeting. The virtual meeting recording 601 may be produced upon conclusion of the virtual meeting, as seen in FIG. 5. The system may then generate the random key 602 by use of the security encryption system, that is then determined to be virtual meeting recording specific. As mentioned previously, the virtual meeting recording 601 includes a meeting identifier supplied by the storage system. This meeting identifier is then used in combination with the presence of each participant in the virtual meeting to generate the random key (or the encryption key) at 602. The virtual meeting recording 601 and the random key generated 602 are both pushed through the authentication encryption system 603.

The authentication encryption system includes any potential secret sharing schema and/or additional constraints needing to be met when a user is attempting to view the virtual meeting recording. Additionally, the random key 602 is also inputted into the secret sharing algorithm 604 that outputs unique key shards 605 for each participant present in the virtual meeting, and therefore the virtual meeting recording 601. The illustration of FIG. 6 then shows that the unique key shards for each specific participant (i.e., in this example there are five participants present) are accompanied by at least one constraint 606 that must be met in order to view the virtual meeting recording requested by the user. It is from this inputting of unique key shards 605 that coincide with the constraints 606 at the security encryption system that may then permit a user to view sensitive information present in a virtual meeting recording.

The various embodiments herein thus describe a technical improvement over conventional methods for storing sensitive information found in a virtual meeting recording to ascertain that the information discussed within the virtual meeting does not become compromised. Rather than relying on personal judgment and/or conventional, low-level storage devices that may be accessible by the pubic, the system and method herein utilizes a security encryption system and a storage device that transforms a virtual meeting recording in a concealed format, and may only be accessed when at least one participant of the original virtual meeting provides their unique key shard as the encryption key for access. Such a system and method may allow virtual meeting recordings to be stored in such a way that minimizes a potential for compromising information, and further utilizes a multi-tier security system and method to from ascertain that sensitive information does not get leaked. In the situation when a piece of information does leak, the system may utilize a method to identify which participant of the virtual meeting is responsible for compromising the data.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   identifying, at an information handling device and utilizing a security encryption system, a virtual meeting invitation;
   recording, utilizing the security encryption system, the virtual meeting responsive to at least one participant accessing the virtual meeting via the virtual meeting invitation, wherein the recording is responsive to identifying a threshold number of participants are present in the virtual meeting;

encrypting, utilizing the security encryption system, the recording of the virtual meeting, wherein the encrypting comprises assigning a unique key shard to the at least one participant of the virtual meeting; and storing, after the encrypting, the encrypted recording of the virtual meeting in a storage system.

2. The method of claim 1, wherein the virtual meeting invitation identifies a list of participants of the virtual meeting.

3. The method of claim 1, wherein the unique key shard is generated for each participant of the virtual meeting, wherein the unique key shard is meeting specific and participant specific.

4. The method of claim 1, wherein the storage system assigns a meeting identifier comprising a security level in order to access the virtual meeting;
wherein the security level is predetermined by a host of the virtual meeting.

5. The method of claim 1, wherein the encrypting is performed in view of encryption settings defined within the virtual meeting invitation.

6. The method of claim 1, further comprising permitting access to the encrypted virtual meeting by:
receiving, at the security encryption system from a participant of the virtual meeting, a notification to share the virtual meeting with a user;
receiving, at the security encryption system, a unique key shard associated with the virtual meeting and the participant;
decrypting, using the security encryption system, the recording of the virtual meeting; and
sharing the unencrypted recording of the virtual meeting with the user.

7. The method of claim 6, wherein the decrypting is responsive to determining that a predetermined number of unique key shards have been received.

8. The method of claim 6, wherein the receiving the notification comprises receiving a request from the user via the storage system.

9. An information handling device, the information handling device comprising:
a processor;
a memory device that stores instructions that when executed by the processor, causes the information handling device to:
identify, utilizing a security encryption system, a virtual meeting invitation;
record, utilizing the security encryption system, the virtual meeting responsive to at least one participant accessing the virtual meeting via the virtual meeting invitation, wherein to record is responsive to identifying a threshold number of participants are present in the virtual meeting;
encrypt, utilizing the security encryption system, the recording of the virtual meeting, wherein to encrypt comprises assigning a unique key shard to the at least one participant of the virtual meeting; and
store, after the encrypting, the encrypted recording of the virtual meeting in a storage system.

10. The information handling device of claim 9, wherein the virtual meeting invitation identities a list of participants of the virtual meeting.

11. The information handling device of claim 9, wherein the unique key shard is generated for each participant of the virtual meeting, wherein the unique key shard is meeting specific and participant specific.

12. The information handling device of claim 9, wherein the storage system assigns a meeting identifier comprising a security level in order to access the virtual meeting;
wherein the security level is predetermined by a host of the virtual meeting.

13. The information handling device of claim 9, wherein to encrypt is performed in view of encryption settings defined within the virtual meeting invitation.

14. The information handling device of claim 9, further comprising permitting access to the encrypted virtual meeting by:
receive, at the security encryption system from a participant of the virtual meeting, a notification to share the virtual meeting with a user;
receive, at the security encryption system, a unique key shard associated with the virtual meeting and the participant;
decrypt, using the security encryption system, the recording of the virtual meeting; and
share the unencrypted recording of the virtual meeting with the user.

15. The information handling device of claim 14, wherein to decrypt is responsive to determining that a predetermined number of unique key shards have been received.

16. A product, the product comprising:
a computer-readable storage device that stores executable code that, when executed by a processor, causes the product to:
identify, at an information handling device and utilizing a security encryption system, a virtual meeting invitation;
record, utilizing the security encryption system, the virtual meeting responsive to at least one participant accessing the virtual meeting via the virtual meeting invitation, wherein to record is responsive to identifying a threshold number of participants are present in the virtual meeting;
encrypt, utilizing the security encryption system, the recording of the virtual meeting, wherein to encrypt comprises assigning a unique key shard to the at least one participant of the virtual meeting; and
store, after the encrypting, the encrypted recording of the virtual meeting in a storage system.

17. The method of claim 1, wherein the unique key shard is a portion of a generated encryption key;
wherein the generated encryption key is specific to the virtual meeting recording.

18. The information handling device of claim 9, wherein the unique key shard is a portion of a generated encryption key;
wherein the generated encryption key is specific to the virtual meeting recording.

* * * * *